United States Patent
Blevins et al.

(10) Patent No.: US 6,818,281 B2
(45) Date of Patent: Nov. 16, 2004

(54) INSERT FOR WINDSHIELD ASSEMBLY

(75) Inventors: Calvin B. Blevins, Madison County, AL (US); Shaun E. Jessup, Madison County, AL (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/208,491

(22) Filed: Jul. 30, 2002

(65) Prior Publication Data

US 2004/0021334 A1 Feb. 5, 2004

(51) Int. Cl.[7] ............................................... B32B 23/02
(52) U.S. Cl. ...................... 428/194; 428/192; 428/193; 428/195; 296/187.03
(58) Field of Search ................. 428/192, 193, 428/194, 195; 296/187.03

(56) References Cited

U.S. PATENT DOCUMENTS

| | | | |
|---|---|---|---|
| 3,953,630 A | * | 4/1976 | Roberts et al. ............... 428/38 |
| 4,059,469 A | * | 11/1977 | Mattimoe et al. ........... 156/108 |
| 4,204,374 A | | 5/1980 | Olson .......................... 52/208 |
| 4,551,372 A | * | 11/1985 | Kunert ......................... 428/38 |
| 4,933,227 A | | 6/1990 | Stewart ....................... 428/192 |
| 4,960,631 A | | 10/1990 | Walters et al. .............. 428/192 |
| 5,270,518 A | | 12/1993 | Naoumenko et al. ........ 219/203 |
| 5,373,672 A | * | 12/1994 | Schulz ......................... 52/235 |
| 6,569,787 B1 | * | 5/2003 | Snelling ..................... 442/135 |

\* cited by examiner

*Primary Examiner*—Deborah Jones
*Assistant Examiner*—G. Blackwell-Rudasill
(74) *Attorney, Agent, or Firm*—Andrew C. Siminerio

(57) ABSTRACT

A windshield assembly having a windshield outer periphery and including a first transparent member, a second transparent member and a transparent interlayer disposed between the first transparent member and the second transparent member. The assembly includes an insert having a first portion and a second portion, and the insert extends a portion of the windshield assembly outer periphery. A portion of the first portion of the insert extends between the first transparent member and the second transparent member. An insert for a windshield assembly is also disclosed.

31 Claims, 2 Drawing Sheets

INSERT FOR WINDSHIELD ASSEMBLY

BACKGROUND OF THE INVENTION

1. Field of the Invention

The present invention relates generally to failure prevention and mitigation mechanisms and, in particular, to a failsafe insert for a pressurized windshield assembly.

2a. Technical Considerations

Windshield assemblies are used in various transportation-related fields for providing a vehicle operator with a clear view of the intended path of travel, while preventing environmental, physical and other impacts and/or interactions. For example, windshield assemblies are used in cars, trucks, buses, trains, aircraft, etc. These windshield assemblies must meet specific design requirements and specifications since a failure of the windshield could cause immediate harm and injury to the vehicle operator, vehicle passengers and others around the vehicle.

Windshield assemblies for high-speed transportation operations, such as aircraft or high-speed transit systems, require higher structural and safety measures, particularly due to the high speeds attained in these modes of transportation. Therefore, aircraft and high-speed transit system windshield assemblies are typically laminated assemblies having multiple interlayer material plies interposed between transparent rigid plies. These rigid plies can be glass or any other well-known substitutes, such as polycarbonates, acrylic resins, polyesters, and rigid transparent polyurethanes.

In high-speed transportation operations, a failure of the windshield assembly is particularly harmful, not only to the operator, but to the multiple passengers traveling within the vehicle. In the case of aircraft, a failure of the windshield assembly could cause depressurization of the cabin, force immediate landing (regardless of location) and could lead to the injury of both the pilots and the passengers.

Therefore, it would be advantageous to provide a mechanism in order to ensure the structural integrity of a pressurized windshield assembly during a failure condition, such as environmental or physical impact.

2b. Patents of Interest

U.S. Pat. No. 5,270,518 to Naoumenko et al. teaches a laminated glazing pane for a transportation vehicle and, in particular, a laminated glazing pane for use in connection with an aircraft windshield.

U.S. Pat. No. 4,960,631 to Walters et al. teaches a laminated transparency for use in aircraft applications and, in particular, a moisture seal for an aircraft windshield to prevent delamination of the windshield plies due to moisture absorbed by the windshield interlayers.

U.S. Pat. No. 4,933,227 to Stewart teaches an aircraft window and, in particular, a lightweight glass and polycarbonate laminate for an aircraft windshield that reduces windshield deflection due to internal aircraft cabin pressure and reduces the load on the polycarbonate plies of the windshield.

U.S. Pat. No. 4,204,374 to Olson teaches an edge design for an impact resistant windshield, which increases an aircraft windshield's ability to absorb or deflect an impact.

SUMMARY OF THE INVENTION

It is, therefore, an object of the present invention to provide an insert for a windshield assembly that maintains the structural integrity of the windshield and its various layers during a failure condition, such as resulting from environmental or physical impact. It is yet another object of the present invention to provide an insert for a windshield assembly that can be used in connection with "plug-in" or clamp-type windshield assemblies.

The present invention is a windshield assembly having a windshield outer periphery and including a first transparent member, a second transparent member, a transparent interlayer disposed between the first transparent member and the second transparent member. The windshield assembly includes an insert with a first portion and a second portion, and the insert extends along at least a portion of the windshield assembly outer periphery. At least a portion of the first portion of the insert extends between the first transparent member and the second transparent member.

The present invention is also directed to an insert for a windshield assembly having a windshield outer periphery and including a first transparent member, a second transparent member and a transparent interlayer disposed between the first transparent member and the second transparent member. The insert includes a first portion and a second portion, and the insert extends along at least a portion of the windshield assembly outer periphery. At least a portion of the first portion of the insert extends between the first transparent member and the second transparent member.

The present invention, both as to its construction and its method of operation, together with the additional objects and advantages thereof, will best be understood from the following description of exemplary embodiments when read in connection with the accompanying drawings.

DETAILED DESCRIPTION OF THE PREFERRED EMBODIMENTS

Figure 1:
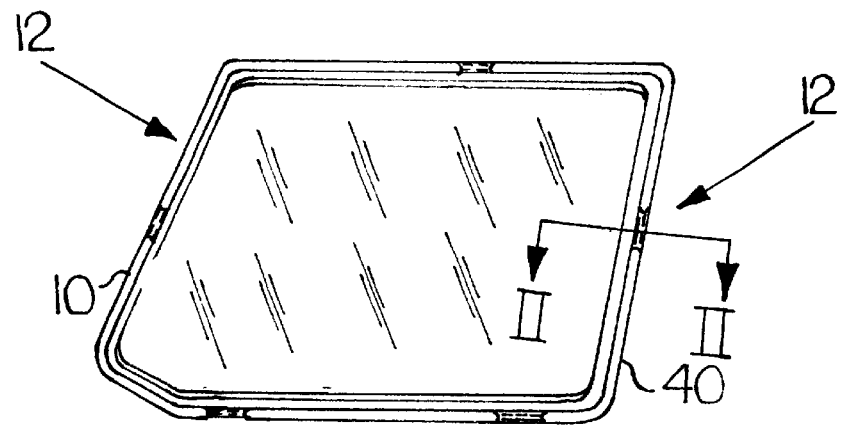
FIG. 1 is a elevational view of a windshield assembly and a first embodiment of an insert for the windshield assembly incorporating features of the present invention.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention can assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Various numerical ranges are disclosed in this patent application. Because these ranges are continuous, they include every value between the minimum and maximum values. Unless expressly indicated otherwise, the various numerical ranges specified in this application are approximations.

A non-limiting, exemplary embodiment of the present invention is shown in FIGS. 1–4 and includes an insert 10 incorporated into a windshield assembly 12. The windshield assembly 12 is a laminated structure having a windshield outer periphery and includes a first transparent member 14, a second transparent member 16 and a transparent interlayer 18 disposed between the first transparent member 14 and the second transparent member 16. As used herein, the term "transparent" means having a visible light transmittance of greater than 0% to 100%. The term "visible light" means electromagnetic energy in the range of 390 nanometers (nm) to 800 nm.

Figure 2:
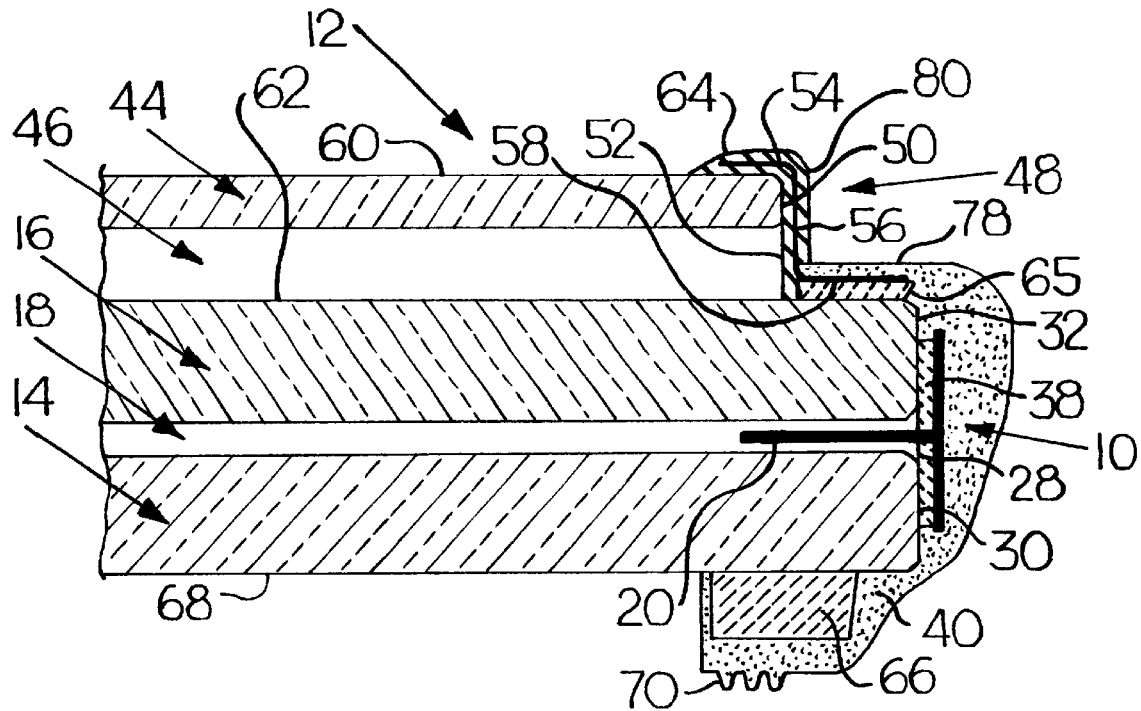
FIG. 2 is a side, sectional view of a portion of the windshield assembly and the insert taken at section II—II of FIG. 1.

In the embodiment shown in FIGS. 1 and 2, the insert 10 includes an insert body 20. The insert 10 extends along or around at least a portion of the windshield outer periphery. In several non-limiting embodiments, the insert 10 extends along a substantial portion of the windshield outer periphery, for example along 50% of the windshield outer periphery, or along 75% of the windshield outer periphery, or along 90% of the windshield outer periphery, or along the entire windshield outer periphery, depending upon the application. The insert body 20 extends between the first transparent member 14 and the second transparent member 16. Further, in one non-limiting embodiment, the insert body 20 extends at least partially into the transparent interlayer 18.

Figure 4A:
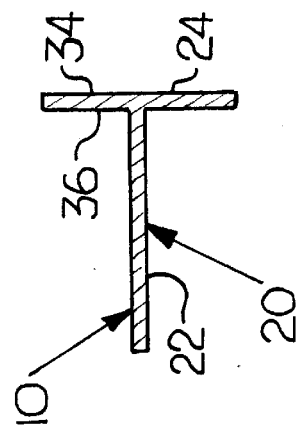
FIGS. 4(a)–(c) are sectional views of three exemplary, non-limiting insert body shapes incorporating features of the present invention.

FIG. 4(a) illustrates an exemplary insert 10 having a straight or linear insert body 20 having a first body portion 22 that can be fully or partially embedded within the transparent interlayer 18. The length that the first body portion 22 extends into the transparent interlayer 18 depends upon the required or specified operator viewing area. Since the insert 10 might not be transparent and extends around at least a portion of the windshield outer periphery, if the first body portion 22 extends too far into the transparent interlayer 18, the operator's view through the transparent interlayer 18 and the second transparent member 16 could be partially obstructed. Many vehicles, for example, aircraft, have specific safety requirements, specifying the viewable (or transparent) area required.

Figure 4B:
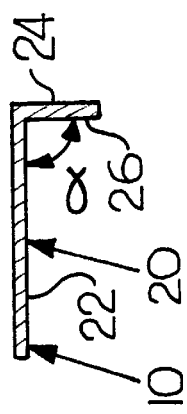
Figure 4C:
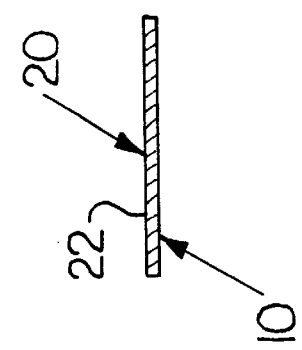

In the non-limiting embodiment of the invention seen in FIGS. 4(b) and 4(c), insert body 20 includes a second body portion 24 that extends at an angle α with respect to the first body portion 22. Although no limiting in the present invention, in one non-limiting embodiment, the angle α can be in the range of 80° to 179°. In the non-limiting embodiment illustrated in FIG. 4(b), the second body portion 24 extends at an angle α of 90° with respect to the first body portion 22. The resulting insert body 20 shape is likened to an "L". In this embodiment, the second body portion 24 includes a second body portion surface 26, which when incorporated into a windshield assembly would be positioned at least partially adjacent either a first transparent member edge 30 of transparent member 14 or a second transparent member edge 32 of transparent member 16, depending upon the orientation of the insert body 20. For example, if the second body portion 24 extends towards the first transparent member 14, the second body portion surface 26 would be positioned at least partially adjacent the first transparent member edge 28. Similarly, if the second body portion 24 extends towards the second transparent member 16, the second body portion surface 26 would be positioned at least partially adjacent the second transparent member edge 32. Furthermore, if the first body portion 22 of insert body 20 is embedded within the interlayer 18, a portion of second body portion surface 26 can also be adjacent a transparent interlayer edge 28 of transparent interlayer 18.

As seen in FIG. 4(c), in a further embodiment, the insert body 20 includes a third body portion 34. Although not required, in this particular non-limiting embodiment, this third body portion 34 extends at an angle α of 90° with respect to the first body portion 22 and includes a third body portion surface 36. In this embodiment, the second body portion 24 extends at an angle α of 90° with respect to the first body portion 22. The insert body 20 shape is likened to a "T". The third body portion surface 36 is positioned at least partially adjacent either the first transparent member edge 30 or the second transparent member edge 32, and the second body portion surface 26 is positioned at least partially adjacent either the first transparent member edge 30 or the second transparent member edge 32, again depending upon the orientation of the insert body 20. In addition, second body portion surface 26 and/or third body portion surface 36 will be adjacent transparent interlayer edge 28.

In one non-limiting embodiment, the edge of the insert body 20, namely the first body portion 22, the second body portion 24, and the third body portion 34, can be tapered or sloped. This use of tapered or sloped edges would have positive effects on the interfaces and interactions between the insert 10 and the windshield assembly 12.

The second body portion surface 26 and, if applicable, the third body portion surface 36 can be secured adjacent the transparent interlayer edge 28, the first transparent member edge 30 and the second transparent member edge 32, as the insert 10 is embedded in the transparent interlayer 18, the first body portion 22 extending therein. This serves to securely attach the insert 10 adjacent the transparent interlayer edge 28, the first transparent member edge 30 and the second transparent member edge 32.

In one non-limiting embodiment, a spacer element 38 (FIG. 2) can be disposed between the second body portion surface 26 and, if applicable, the third body portion surface 36, and the transparent interlayer edge 28, the first transparent member edge 30 and the second transparent member edge 32. This spacer element 38 is used to protect the surface structural integrity of the first transparent member edge 30, the second transparent member edge 32 and the transparent interlayer edge 28, as well as the integrity of the first transparent member 14, the second transparent member 16 and the transparent interlayer 18. Specifically, the use of the spacer element 38 prevents the rigid insert body 20 from scratching or chipping the first transparent member edge 30, the second transparent member edge 32 and the transparent interlayer edge 28, thereby preventing stress-risers and crack initiation. Although not limiting in the present invention, the spacer element 38 can be a phenolic spacer or the like, but must adequately separate the second body portion 24 from contacting the first transparent member edge 30, the second transparent member edge 32 and the transparent interlayer edge 28.

When used in connection with a "plug in" or clamp-type windshield assembly, the windshield assembly 12 includes an edge member 40, which surrounds the first transparent member edge 30, the second transparent member edge 32 and the transparent interlayer edge 28, as well as insert 10. This edge member 40 is engageable with a vehicle frame section 42 on a vehicle (not shown). In one non-limiting embodiment, the vehicle frame section 42 (shown in FIG. 3) is an airframe in an aircraft. Although not required, in one non-limiting embodiment, the insert body 20 can be at least partially embedded within the edge member 40 or, alternatively, can be formed integrally with the edge member 40. Although not limiting in the present invention, the edge member 40 can be formed from a material, such as, but no limited to, silicone rubber or other flexible, yet durable, material.

In one non-limiting embodiment, the windshield assembly 12 also includes a third transparent member 44 laminated to the second transparent member 16 by a second transparent interlayer 46, as shown in FIG. 2. This use of multiple transparent members (14, 16, 44) and transparent interlayers (18, 46) strengthens the structural integrity of the overall windshield assembly 12.

In order to provide a securement area or lip for a clamp-type windshield assembly, an attachment mechanism 48 is utilized. Specifically, the attachment mechanism 48 is attached to a third transparent member edge 50 and a second transparent interlayer edge 52 via a clamping action, adhesive or other method of fixation. When attached, the attachment mechanism 48 provides a lip in conjunction with the edge member 40 for attaching the structure to the vehicle frame 42. In one non-limiting embodiment, the attachment mechanism 48 is manufactured from a rigid material, such as, but no limited to, stainless steel.

The attachment mechanism 48 in the non-limiting embodiment shown in FIG. 2 includes a first attachment mechanism portion 54, a second attachment mechanism portion 56 and a third attachment mechanism portion 58, and is commonly referred to as a "Z-bar." The attachment mechanism 48 extends around at least a portion of the windshield assembly 12 outer periphery. In one non-limiting embodiment, the attachment mechanism 48 extends around the entire windshield outer periphery. The first attachment mechanism portion 54 is secured to a third transparent member outer surface 60, the second attachment mechanism portion 56 is secured to the third transparent member edge 50 and the second transparent interlayer edge 52, and the third attachment mechanism portion 58 is secured to a second transparent member outer surface 62. The edge member 40 further secures the attachment mechanism 48 by securing at least the third attachment mechanism portion 58 to the second transparent member outer surface 62.

An attachment mechanism seal element 64 is disposed around at least a portion of the attachment mechanism 48. This attachment mechanism seal element 64 prevents the infiltration of moisture and ensures air-tightness in the windshield assembly 12. In addition, as with the spacer element 38, the attachment mechanism seal element 64 acts to prevent direct contact between at least a portion of the attachment mechanism 48 and at least one of the third transparent member outer surface 60, third transparent member edge 50, second transparent interlayer edge 52 and second transparent member outer surface 62, preventing scratching and/or chipping of the third transparent member outer surface 60, third transparent member edge 50, second transparent interlayer edge 52 or second transparent member outer surface 62. Without limiting in the present invention, the attachment mechanism seal element 64 can be a material, such as, but not limited to, a polysulfide or other similar sealant.

An attachment mechanism spacer element 65 is disposed between the third attachment mechanism portion 58 and the second transparent member outer surface 62. As discussed hereinabove in connection with the spacer element 38 and attachment mechanism seal element 64, the attachment mechanism spacer element 65 acts to prevent direct contact between the rigid attachment mechanism 48 and the second transparent member outer surface 62, preventing scratching and/or chipping of the second transparent member outer surface 62. Although not limiting in the present invention, the attachment mechanism spacer element 65 can be manufactured from materials, such as, but not limited to, phenolics or other similar compounds.

An edge member spacer element 66 is disposed between the edge member 40 and a first transparent member inner surface 68. The edge member spacer element 66 is used to provide sufficient rigidity to the overall structure of the edge member 40 and, further, to provide an adjustability function for using the edge member 40 with different windshield dimensions.

Figure 3:
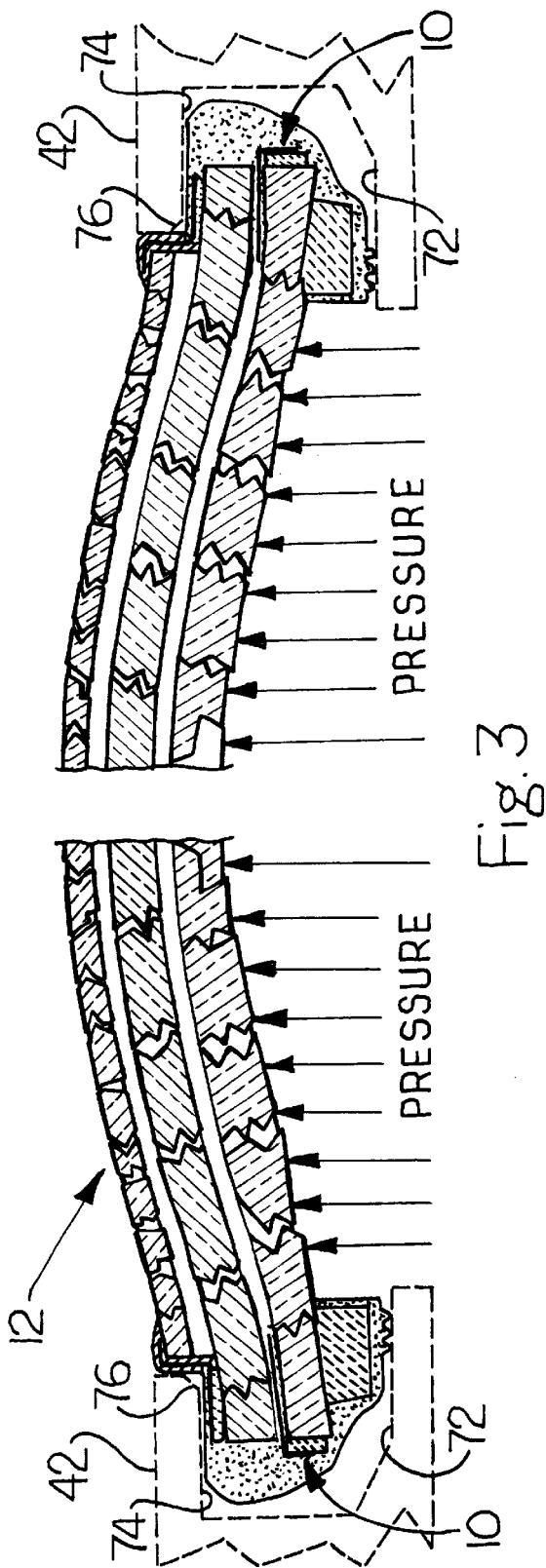
FIG. 3 is a side, sectional view of the windshield assembly and a further embodiment of an insert during a failure condition.

Although not required, the edge member 40 can also include a gasket element 70 configured to frictionally engage a vehicle frame first inner wall 72 (see (FIG. 3). The gasket element 70 engages the edge member 40 with the vehicle frame 42 and also prevents moisture infiltration between the edge member 40 and the vehicle frame 42. In one non-limiting embodiment, the gasket member 70 is integrally formed with the edge member 40.

Referring to FIGS. 2 and 3, to further secure the edge member 40 to the vehicle frame 42, a vehicle frame second inner wall 74 engages the edge member 40, and a vehicle frame edge 76 engages the attachment mechanism 48, for example, along surface 78 of edge member 40 and surface 80 of seal element 64. These attachments act to firmly and safely secure the windshield assembly 12 to the vehicle frame 42, and, thus, the vehicle (not shown).

The first transparent member 14, the second transparent member 16, the third transparent member 44, the first transparent interlayer 18 and the second transparent interlayer 46 are materials selected from glass, plastic, polycarbonate, acrylin resin, polyester, rigid transparent polyurethane, polyvinylbutyral or other similar materials. The insert 10 is manufactured from a polymer, a metal, a semi-metal, an alloy or a composite material.

The insert 10 should be able to flex, without shearing, during a failure condition. Further, the first transparent member 14, the second transparent member 16 and the third transparent member 44, as well as the first transparent interlayer 18 and the second transparent interlayer 46, can be constructed from one or multiple plies or layers of material. When multiple plies are used, the first body portion 22 of insert 10 can be embedded and laminated between two of the plies, simplifying the method of manufacture.

As seen in FIG. 3, which utilizes the insert 10 illustrated in FIG. 4(b), when any of the first transparent member 14, the second transparent member 16 or the third transparent member 44 fail or rupture, the insert 10, as embedded within the first transparent interlayer 18 (which is bonded between the first transparent member 14 and the second transparent member 16), holds the first transparent member 14 and the second transparent member 16 to prevent total failure and dislodgement of the windshield assembly 12. In addition, since the second transparent member 16 is bonded to the third transparent member 44 via the second transparent interlayer 46, all transparent members (14, 16, 44) and transparent interlayers (18, 46) are safely secured to the vehicle (not shown). The insert 10 is capable of flexing, but does not break or shear. Therefore, the cabin pressure (when used in connection with an aircraft) of the vehicle is maintained and the windshield assembly 12 is not displaced.

Overall, the present invention provides an insert 10, which securely fastens the windshield assembly 12 to the vehicle during a failure condition. The insert 10 maintains the structural integrity of the windshield assembly 12 and its various layers during a failure condition, resulting from environmental or physical impact. Further, the insert 10 is particularly useful in connection with "plug-in" or clamp-type windshield assemblies 12.

This invention has been described with reference to the preferred embodiments. Obvious modifications and alterations will occur to others upon reading and understanding the preceding detailed description. It is intended that the invention be construed as including all such modifications and alterations.

We claim:

1. A windshield assembly having a windshield outer periphery, comprising:

a first transparent member;

a second transparent member;

a transparent interlayer disposed between the first transparent member and the second transparent member;

an edge member having an outer surface, the edge member attached to and at least partially surrounding an outer edge of the first transparent member, an outer edge of the second transparent member and an outer edge of the transparent interlayer, the edge member configured to engage a vehicle frame, and an insert having a first portion and a second portion, wherein (a) the insert extends along at least a portion of the windshield assembly outer periphery, (b) at least a portion of the first portion of the insert extends between the first transparent member and the second transparent member, (c) the second portion of the insert is between the windshield assembly outer periphery and the outer surface of the edge member, and (d) the insert terminates short of the outer surface of the edge member.

2. The windshield assembly of claim 1, wherein the second portion of the insert extends at an angle with respect to the first portion of the insert.

3. The windshield assembly of claim 2, wherein the angle is in the range of 80° to 179°.

4. The windshield assembly of claim 2, wherein the second portion of the insert has a second portion surface and at least a portion of the second portion surface is attached to at least one of the outer edge of the first transparent member, the outer edge of the second transparent member and the outer edge of the transparent interlayer.

5. The windshield assembly of claim 4, wherein the second portion of the insert extends at an angle of 90° with respect to the first portion of the insert.

6. The windshield assembly of claim 4, further comprising an insert spacer element disposed at least partially between the second portion surface of the second portion of the insert and at least one of the outer edge of the transparent member, the outer edge of the second transparent member and the outer edge of the interlayer.

7. The windshield assembly of claim 4, further comprising:

a third portion of the insert extending at an angle with respect to the first portion and having a third portion surface;

wherein at least a portion of the third portion surface is attached to at least one of the outer edge of the first transparent member, the outer edge of the second transparent member and the outer edge of the transparent interlayer.

8. The windshield assembly of claim 7, wherein the third portion of the insert extends at an angle of 90° with respect to the first portion of the insert, and the second portion of the insert extends at an angle of 90° with respect to the first portion of the insert.

9. The windshield assembly of claim 7, further comprising a spacer element disposed between at least a portion of the second portion surface of the insert and at least one of the outer edge of the first transparent member, the outer edge of the second transparent member and the outer edge of the transparent interlayer; and disposed between at least a portion of the third portion surface of the insert and at least one of the outer edge of the first transparent member, the outer edge of the second transparent member and the outer edge of the transparent interlayer.

10. The windshield assembly of claim 1, further comprising a spacer element disposed between at least a portion of the insert and at least one of the outer edge of the first transparent member, the outer edge of the second transparent member and the outer edge of the transparent interlayer.

11. A windshield assembly having a windshield outer periphery, comprising:

a first transparent member;

a second transparent member;

a transparent interlayer disposed between the first transparent member and the second transparent member;

an insert having a first portion and a second portion, wherein the insert extends along at least a portion of the windshield assembly outer periphery and at least a portion of the first portion of the insert extends between the first transparent member and the second transparent member, and an edge member attached to and at least partially surrounding an outer edge of the first transparent member, an outer edge of the second transparent member and an outer edge of the transparent interlayer, the edge member configured to engage a vehicle frame wherein the edge member surrounds a spacer element adjacent an inner surface of the first transparent member and configured to provide adjustability and rigidity to the windshield assembly.

12. The windshield assembly of claim 1, wherein the edge member includes a gasket element configured to engage a vehicle frame and provide a frictional engagement and moisture seal therewith.

13. The windshield assembly of claim 1, wherein at least a portion of the insert is embedded within the transparent interlayer.

14. The windshield assembly of claim 13, wherein the transparent interlayer comprises at least two plies of material, and the at least a portion of the first body portion of the insert is between the at least two plies of material.

15. The windshield assembly of claim 1, wherein the first transparent member, the second transparent member and the transparent interlayer are each selected from glass, plastic, polycarbonate, acrylic resin, polyester, rigid transparent polyurethane and polyvinylbutyral.

16. The windshield assembly of claim 1, wherein the insert is selected from polymer, metal, semi-metal, alloy and composite material.

17. The windshield assembly of claim 1, wherein the insert is in the form of a T-shape or an L-shape.

18. The windshield assembly of claim 1, wherein the insert is manufactured from a flexible material.

19. The windshield assembly of claim 1, wherein edges of the insert are tapered.

20. The windshield assembly of claim 1, wherein at least one of the first transparent member, the second transparent member and the transparent interlayer include multiple plies.

21. The windshield assembly of claim 1, further comprising:

a third transparent member; and a second transparent interlayer disposed between the second transparent member and the third transparent member.

22. An insert for a windshield assembly having a windshield outer periphery and comprising a first transparent member, a second transparent member and a transparent interlayer disposed between the first transparent member and the second transparent member, the insert comprising:

a first portion, a second portion extending at an angle with respect to the first portion and a third portion extending at an angle with respect to the first portion to provide the insert with a generally T-shape cross section wherein the second portion of the insert has a second portion surface and the third portion of the insert has a third portion surface, wherein the insert extends along at least a portion of the windshield assembly outer periphery and at least a portion of the first portion of the insert extends between the first transparent member and the second transparent member, at least a portion of the second portion surface is attached to at least one of the outer edge of one of the transparent members and a first portion of the outer edge of the transparent interlayer, and at least a portion of the third portion surface is attached to at least one of the outer edge of the other one of the transparent members and a portion of an outer edge of the transparent interlayer, other than the first portion of the transparent interlayer.

23. The insert of claim 22, wherein the second portion of the insert extends at an angle with respect to the first portion of the insert.

24. The insert of claim 23, wherein the angle of the second portion of the insert with respect to the first portion is in the range of 80° to 179°.

25. The insert of claim 23, wherein the second portion of the insert extends at an angle of 90° with respect to the first portion of the insert.

26. The insert of claim 22, wherein the third portion of the insert extends at an angle of 90° with respect to the first portion of the insert, and the second portion of the insert extends at an angle of 90° with respect to the first portion of the insert.

27. A method of maintaining a windshield assembly integrity during a failure condition, the windshield assembly having a first transparent member, a second transparent member, a transparent interlayer disposed between the first transparent member and the second transparent member, and an edge member attached to and at least partially surrounding an edge of the first transparent member, an edge of the second transparent member and an edge of the third transparent member, the edge member configured to engage a vehicle frame, the method comprising the steps of:

(a) providing an insert with a first portion and a second portion, (b) positioning at least a portion of the first portion of the insert between the first and second transparent members;

(c) positioning the edge member over the insert an edge of the first transparent member, an edge of the second transparent member and an edge of the third transparent member, wherein (1) the insert extends along at least a portion of the windshield assembly outer periphery, and (2) at least a portion of the first portion of the insert extends between the first transparent member and the second transparent member, (3) the second portion of the insert is between the windshield assembly outer periphery and the outer surface of the edge member, and (4) the insert terminates short of the outer surface of the edge member, and (d) during a failure condition, with respect to one of the first transparent member and the second transparent member, maintaining the integrity of the transparent interlayer via the insert, whereby the transparent interlayer is capable of maintaining forces of pressure.

28. The method of claim 27, wherein the positioning step (b) includes embedding at least a portion of the first portion of the insert within the transparent interlayer.

29. The windshield assembly of claim 21 further comprising an attachment member having a Z-shaped cross section wherein one of the outer legs of the attachment member is mounted on surface of the second transparent member and the other outer leg of the attachment member is mounted on outer surface of the third transparent member.

30. The windshield assembly of claim 11, further comprising:

a third transparent member;

a second transparent interlayer disposed between the second transparent member and the third transparent member, and an attachment member having a Z-shaped cross section wherein one of the outer legs of the attachment member is mounted on surface of the second transparent member and the other outer leg of the attachment member is mounted on outer surface of the third transparent member.

31. A windshield assembly having a windshield outer periphery, comprising:

a first transparent member;

a second transparent member;

a third transparent member;

a first transparent interlayer disposed between the first transparent member and the second transparent member;

a second transparent member disposed between the second transparent member and the third transparent member;

an insert having a first portion and a second portion, wherein the insert extends along at least a portion of the windshield assembly outer periphery and at least a portion of the first portion of the insert extends between the first transparent member and the second transparent member, and an attachment member having a Z-shaped cross section wherein one of the outer legs of the attachment member is mounted on surface of the second transparent member and the other outer leg of the attachment member is mounted on outer surface of the third transparent member.

* * * * *